United States Patent [19]

Imagawa

[11] Patent Number: 4,651,483
[45] Date of Patent: Mar. 24, 1987

[54] CONSTRUCTION OF DOOR IN MOTOR VEHICLE

[75] Inventor: Toshiyuki Imagawa, Toyota, Japan

[73] Assignee: Toyota Jidosha Kabushiki Kaisha, Aichi, Japan

[21] Appl. No.: 472,185

[22] Filed: Mar. 4, 1983

[30] Foreign Application Priority Data

Mar. 10, 1982 [JP] Japan .............................. 57-33650[U]

[51] Int. Cl.⁴ ............................................. E06B 1/04
[52] U.S. Cl. ...................................................... 52/212
[58] Field of Search ................. 52/730, 212, 729, 802, 52/805; 296/29, 30, 187, 191; 403/167, 168, 265, 270, 272

[56] References Cited

U.S. PATENT DOCUMENTS

| | | | |
|---|---|---|---|
| 2,664,182 | 12/1953 | Williams | 52/805 |
| 3,050,831 | 8/1982 | Diamond | 52/729 X |
| 3,263,387 | 8/1966 | Simpson | 52/729 X |
| 3,283,464 | 11/1966 | Litzka | 52/729 X |

FOREIGN PATENT DOCUMENTS 2433142 1/1976 Fed. Rep. of Germany ........ 52/729

Primary Examiner—William F. Pate, III
Assistant Examiner—Creighton Smith
Attorney, Agent, or Firm—Kenyon & Kenyon

[57] ABSTRACT

In a construction of a door in a motor vehicle, at a position below a triangular portion located at the forward or rear end of the door where belt lines of a main body of the door and a door window frame intersect at an acute angle, flanges are projected from top portions of a door inner panel and a door outer panel outwardly and inwardly in the thickness-wise direction of the door, respectively, and these flanges are welded to each other. These flanges are formed as a pair of triangular flanges projecting from the door inner panel and the door outer panel with vertexes of the triangular flanges opposed to each other, and the triangular flanges are overlapped at least at portions close to the vertexes thereof and welded to each other at the portions thus overlapped.

6 Claims, 3 Drawing Figures

CONSTRUCTION OF DOOR IN MOTOR VEHICLE

BACKGROUND OF THE INVENTION

1. Field of the Invention

This invention relates to door constructions in a motor vehicle, and more particularly to a construction of a door in a motor vehicle wherein reinforcing flanges are provided for increasing the rigidity of a triangular portion of a door not having a so-called triangular window.

2. Description of the Prior Art

A so-called triangular window in a door of a motor vehicle is openably provided at the forward end of the door where belt lines of a main body of the door and the window frame intersect each other at an acute angle. However, most of the motor vehicles produced and used at present lack triangular windows.

In a door not having a triangular window, the resistance of the window frame portion of the door to bending is reduced at the location where the triangular window would otherwise be provided, and the window glass and frame are drawn outwardly under the influence of the air stream and wind pressure during high speed driving of a vehicle so as to create gaps between the window frame portion of the door and the vehicle body, whereby noise in the passenger compartment is increased and air tightness of the compartment is deteriorated.

To overcome this problem, heretofore an arrangement has been adopted as shown in FIG. 1, such that at a location below a triangular portion 4 located at the forward or rear end of a door 1, where belt lines 2 of a main body of door 1 and a window frame 3 of the door intersect each other at an acute angle, flanges 7 are projected from top portions of a door outer panel 5 and a door inner panel 6 inwardly and outwardly in the thickness-wise direction of the door, respectively, and these flanges 7 are welded to each other, whereby the resistance to bending of a lower part of the triangular portion 4 is increased.

Two pairs of the aforesaid flanges 7, each being of a substantially square shape, are normally arranged in the longitudinal direction of the door, with each pair of flanges projecting from the door inner panel 6 and the door outer panel 5, respectively, and each opposing pair of flanges are respectively spot-welded each at one point, i.e., at a total of two points in the longitudinal direction of the door.

However, in the conventional reinforcing construction as described above, the projecting forms of the flanges 7 are complicated, difficulties are encountered in the work of surface-of-surface alignment of these flanges 7 due to the presence of the plurality of flanges, differences in height tend to occur between the flanges 7, workability during welding is low, errors in assembly tend to occur, and hence, the above-described reinforcing construction is disadvantageous in that distortions due to the welding tend to be caused to the door inner panel 6 or the door outer panel 5.

Moreover, because of the form of the joint between the flanges 7 as shown in FIG. 1, if a bending force is applied to the door window frame 3, then a torsion acts on a mounting portion of the door window frame 3, and this torsion causes the door inner panel 6 and the door outer panel 5 to move relative to each other, whereby the flanges 7 tend to be twisted.

SUMMARY OF THE INVENTION

It is therefore the primary object of the present invention to provide a construction of a door in a motor vehicle wherein no distortion due to joining through welding is caused to a door inner panel or a door outer panel.

It is another object of the present invention to provide a construction of a door in a motor vehicle wherein the rigidity at joints is improved to prevent distortions from occurring.

It is a further object of the present invention to provide a construction of a door in a motor vehicle wherein the number of spot welds can be reduced during the welding work.

To achieve one of the above-described objects, the present invention contemplates that, in a construction of a door in a motor vehicle wherein, at a position downwardly of a triangular portion located at the forward or rear end of the door, where belt line of a main body of the door and a window frame of the door intersect at an acute angle, flanges are projected from top portions of a door inner panel and a door outer panel outwardly and inwardly in the thickness-wise direction of the door, respectively, and these flanges are welded to each other; these flanges are formed into a pair of triangular flanges projecting from the door inner panel and the door outer panel with vertexes of the triangular flanges opposed to each other; and the triangular flanges are overlapped at least at portions close to the vertexes thereof and welded to each other at the portions thus overlapped.

To achieve one of the above-described objects, the present invention contemplates that, in a construction of a door in a motor vehicle having the above-described construction, the overlapped triangular flanges are welded to each other at portions close to the vertexes of the triangular shapes.

To achieve one of the above-described objects, the present invention contemplates that, in a construction of a door in a motor vehicle having the above-described construction, a single welding spot is selected at a portion close to the vertex of each of the aforesaide triangular flanges.

To achieve one of the above-described objects, the present invention contemplates that, in a construction of a door in a motor vehicle having the above-described construction, the vertex angles of the pair of triangular flanges thus overlapped are obtuse angles.

To achieve one of the above-described objects, the present invention contemplates that, in a construction of a door in a motor vehicle having the above-described construction, bases opposite the overlapped vertexes of the aforesaid triangular flanges are equal to the lengths of the belt lines of the main body of the door at the aforesaid triangular portion.

BRIEF DESCRIPTION OF THE DRAWINGS

The exact nature of the invention, as well as other objects and advantages thereof, will be readily apparent from consideration of the following specification relating to the accompanying drawings, in which like reference characters designate the same or similar parts through the figures thereof and wherein.

DETAILED DESCRIPTION OF THE PREFERRED EMBODIMENT

Description will hereunder be given of an embodiment of the present invention with reference to the accompanying drawings.

Figure 1:
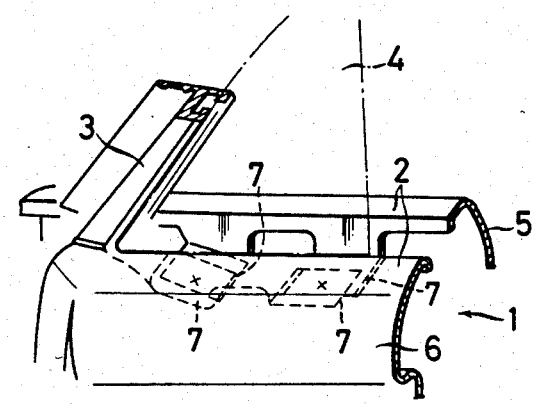
FIG. 1 is a perspective view showing the region close to the triangular portion in the conventional construction of a door in a motor vehicle.

In this embodiment, the same reference numerals as shown in FIG. 1 are used in other figures to designate the same or similar parts, so that detailed description will be omitted.

Figure 2:
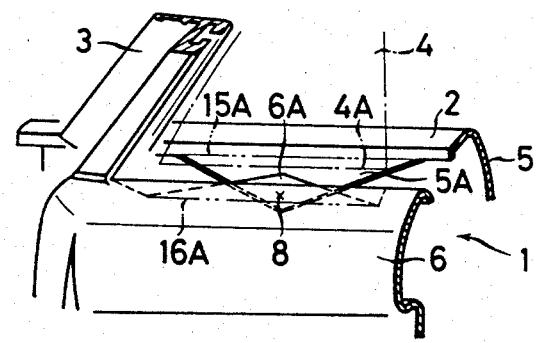
FIG. 2 is a perspective view similar to FIG. 1, showing an embodiment of the construction of a door in a motor vehicle according to the invention.
Figure 3:
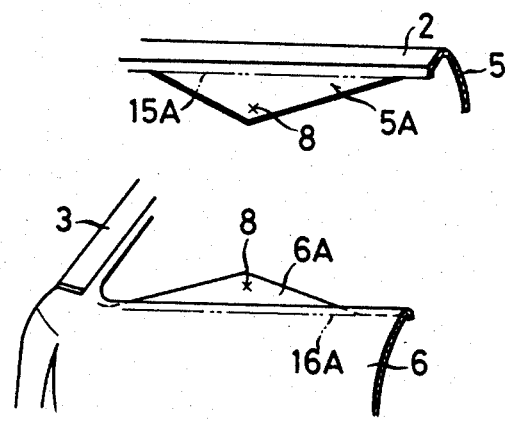
FIG. 3 is a disassembled perspective view showing the above-mentioned embodiment.

As shown in FIGS. 2 and 3, this embodiment is of an arrangement in a construction of a door in a motor vehicle wherein, at a position downwardly of a triangular portion 4 located at the forward or rear end of the door, where belt line 2 of a main body of door 1 and a window frame 3 intersect each other at an acute angle, flanges are projected from top portions of a door outer panel 5 and a door inner panel 6 inwardly and outwardly in the thicknesswise direction of the door, respectively, and these flanges are welded to each other. The aforesaid flanges are a pair of triangular flanges 5A and 6A projecting from the door outer panel 5 and the door inner panel 6, with vertexes of the triangular flanges 5A and 6A opposed to each other, and the triangular flanges 5A and 6A are overlapped at least at portions close to the vertexes thereof and are welded to each other at the portions thus overlapped.

One welding spot 8 is selected at the portion close to the vertex of each of the aforesaid triangular flanges 5A and 6A.

Furthermore the vertex angles of the aforesaid overlapped triangular flanges 5A and 6A are obtuse angles, and bases 15A and 16A opposed to the vertexes are disposed downwardly of a base 4A of the aforesaid triangular portion 4 and are substantially equal to the length of the base 4A.

In this embodiment, even if a bending force is applied to the door window frame 3 so as to cause a torque to act on the mounting portion of the door window frame 3, pushing of one of the triangular shapes against the other prevents the door outer panel 5 and the door inner panel 6 from moving relative to each other because the door outer panel 5 and the door inner panel 6 are jointed to each other through the triangular flanges 5A and 6A at the portion downwardly of the triangular portion 4.

Particularly, in this embodiment, the vertex angles of the triangular flanges 5A and 6A thus overlapped are obtuse angles, whereby the region of opposition of the triangular shapes is large, thereby enabling a strong resistance to torsion. Furthermore, the bases 15A and 16A of the triangular flanges 5A and 6A are disposed below the base 4A of the triangular portion 4 and are substantially equal to the length of the base 4A, and hence, the resistance to torsion is advantageously high.

Furthermore, in this embodiment, only one pair of triangular flanges 5A and 6A project from the door outer panel 5 and the door inner panel 6, whereby the surface-to-surface alignment between the triangular flanges 5A and 6A is facilitated, so that the welding work can be easily carried out. Moreover, even if a difference in height occurs between the triangular flanges 5A and 6A due to an error in assembling of the door outer panel 5 with the door inner panel 6, no distortion due to welding is caused to the door outer panel 5 or the door inner panel 6 because there is only one welding spot 8 therebetween.

In addition to the above, in this embodiment, only one welding spot is selected through the flanges of the door outer panel 5 and the door inner panel 6, whereby only one spot welding suffices, so that the workability in welding can be improved.

Further, in the above-described embodiment, the triangular flanges 5A and 6A are welded to each other at one welding spot 8. However, when a difference in height between the door outer panel 5 and the door inner panel 6 due to an error in assembling is small, two welding spots may be used. However, when only one welding spot is used, the workability in welding can be improved and distortion due to the difference in height between the flanges can be readily absorbed.

It should be apparent of those skilled in the art that the abovedescribed embodiments are merely representative of the principles of the present invention. Numerous and varied other arrangements can be readily devised by those skilled in the art without departing from the spirit and the scope of the invention.

What is claimed is:

1. A construction of a door for a motor vehicle, the door having a main body with forward and rear ends and comprising a door inner panel and a door outer panel spaced from and approximately parallel to the door inner panel, the door inner and outer panels each having a top portion, the top portions of the door inner and outer panels forming parallel spaced apart belt lines of the main body, and a door window frame extending above the main body and intersecting the belt lines of the door inner and outer panels at an acute angle at one of the forward and rear ends of said main body, the door further having flanges projecting approximately perpendicularly from the top portion of the door inner panel toward the door outer panel adjacent to said intersection and projecting approximately perpendicularly from the top portion of the door outer panel toward the door inner panel at the same location, one of the flanges overlapping and being welded to the other, wherein the improvement comprises:

the flange of the door inner panel side consists of a single first triangular tab having a base attached to the top portion of the door inner panel and a vertex extending approximately perpendicularly from the door inner panel toward the door outer panel, and the flange of the door outer panel side consists of a single second triangular tab having a base attached to the top portion of the door outer panel and a vertex extending approximately perpendicularly from the door outer panel toward the door inner panel, one of the first and second tabs overlapping the other at least at portions close to said vertices and being welded to the other at the portions thus overlapped, and wherein the length of the base of each triangular tab is equal to the length of the belt lines of the door inner and outer panels at a triangular portion located at said one of the forward and rear ends of the main body of the door.

2. A construction of a door according to claim 1 wherein said triangular tabs thus overlapped are welded to each other at positions close to the respective vertices.

3. A construction of a door according to claim 1 wherein the vertex angle of each triangular tab is an obtuse angle.

4. A construction of a door according to claim 2 wherein the vertex angle of each triangular tab is an obtuse angle.

5. A construction of a door for a motor vehicle, the door having a main body with forward and rear ends and comprising a door inner panel and a door outer panel spaced from the door inner panel, the door inner and outer panels each having a top portion, the top portions of the door inner and outer panels forming parallel spaced apart belt lines of the main body, and a door frame extending above the main body and intersecting the belt lines of the door inner and outer panels at an acute angle at one of the forward and rear ends of said main body, the door further having flanges projecting from the top portion of the door inner panel toward the door outer panel adjacent to said intersection and projecting from the top portion of the door outer panel toward the door inner panel at the same location, one of the flanges overlapping and being welded to the other, wherein the improvement comprises:

the flange of the door inner panel side consists of a single first triangular tab having a base attached to the top portion of the door inner panel and a vertex extending toward the door outer panel, and the flange of the door outer panel side consists of a single second triangular tab having a base attached to the top portion of the door outer panel and a vertex extending toward the door inner panel, one of the first and second tabs overlapping the other at least at portions close to said vertices and being welded to the other at the portions thus overlapped by only a single spot weld located close to the vertex of each tab, and wherein the length of the base of each triangular tab is equal to the length of the belt lines of the door inner and outer panels at a triangular portion located at said one of the forward and rear ends of the main body of the door.

6. A construction of a door for a motor vehicle, the door having a main body with forward and rear ends and comprising a door inner panel and a door outer panel spaced from the door inner panel, the door inner and outer panels each having a top portion, the top portions of the door inner and outer panels forming parallel spaced apart belt line of the main body, and a door frame extending above the main body and intersecting the belt lines of the door inner and outer panels at an acute angle at one of the forward and rear ends of said main body, the door further having flanges projecting from the top portion of the door inner panel toward the door outer panel adjacent to said intersection and projecting from the top portion of the door outer panel toward the door inner panel at the same location, one of the flanges overlapping and being welded to the other, wherein the improvement comprises:

the flange of the door inner panel side consists of a single first triangular tab having a base attached to the top portion of the door inner panel and a vertex extending toward the door outer panel, and the flange of the door outer panel side consists of a single second triangular tab having a base attached to the top portion of the door outer panel and a vertex extending toward the door inner panel, one of the first and second tabs overlapping the other at least at portions close to said vertices and being welded to the other at the portions thus overlapped by only a single spot weld located close to the vertex of each tab, and wherein the length of the base of each triangular tab is equal to the length of the belt lines of the door inner and outer panels at a triangular portion located at said one of the forward and rear ends of the main body of the door, and wherein the vertex angle of each triangular tab is an obtuse angle.

* * * * *